United States Patent [19]

Abdelrahman

[11] Patent Number: 4,892,762
[45] Date of Patent: Jan. 9, 1990

[54] REDUCED CALORIE HIGH FIBER BREAD CONTAINING A TREATED SOY POLYSACCHARIDE MATERIAL

[75] Inventor: Abdelrahman A. Abdelrahman, St. Louis, Mo.

[73] Assignee: Continental Baking Company, Del.

[21] Appl. No.: 192,971

[22] Filed: May 12, 1988

[51] Int. Cl.$^4$ .................... A21D 8/02; A21D 13/04
[52] U.S. Cl. .................................... 426/549; 426/21; 426/507; 426/634
[58] Field of Search .................. 426/549, 634, 21, 507

[56] References Cited

U.S. PATENT DOCUMENTS 3,979,523 9/1976 Titcomb et al. .................. 426/19
4,590,076 5/1986 Titcomb et al. .................. 426/62

FOREIGN PATENT DOCUMENTS 56-32885 7/1981 Japan .

OTHER PUBLICATIONS

Nippon Shokuhim Kogyo Gakkaiski, vol. 31, No. 5, pp. 299–305 (1984) Functional Properties of Process Soybean Polysaccharide.

Nippon Shokuhim Kogyo Gakkaishi, vol. 31, No. 5 (1984) pp. 306–313, Utilization of Processed Soybean Polysaccharide For Cooked Food Products.

Primary Examiner—Donald E. Czaja
Assistant Examiner—Mary S. Mims
Attorney, Agent, or Firm—Virgil B. Hill

[57] ABSTRACT

The present invention relates to a process for the production of a baked product such as bread having reduced calories and a high fiber content wherein improved specific volume (cc/gm) is achieved comprising forming a flour base dough which contains an added amount of a treated soy polysaccharide material wherein the soy polysaccharide material is treated by hydration at a weight ratio of polysaccharide material to water of about 1:0.5 to 1:4 and heated at a temperature and time sufficient to improve the specific volume (cc/gm) of the baked product, as compared to the use of an untreated soy polysaccharide material.

17 Claims, No Drawings

REDUCED CALORIE HIGH FIBER BREAD CONTAINING A TREATED SOY POLYSACCHARIDE MATERIAL

BACKGROUND OF THE INVENTION

The present invention relates to a process for the treatment of a soy polysaccharide material to improve baking performance and the use of this treated material to produce a baked product of reduced calories which has both improved specific volume (cc/gm) and crumb texture.

Foodstuffs that are relatively high in fiber and that have a reduced level of calories have become increasingly important to the consumer. Baked products, such as bread, often contain a dietary fiber source as a replacement for ingredients in the bread dough which have a higher caloric value. A variety of dietary fiber sources have been used to accomplish this objective although quite often the addition of certain types of dietary fiber sources have a deleterious effect on the dough used for baking or actually affect the volume or texture of the bread or baked product itself. This result and effect of the dietary fiber on the baking performance of the dough often represents a limit both on the amount of fiber that may be used in the baking process as well as the type of fiber employed.

Up until recent years the most common additive as a dietary fiber source to bread dough has been alpha cellulose as generally described in U.S. Pat. Nos. 3,979,523 and 4,590,076. Alpha cellulose, constitutes a preferred and desirable source of dietary fiber for baked products and both of these references describe the use of this material for bread doughs of various types. More recently, it has been discovered that various other fiber sources also may be employed in the production of baked products having high dietary fiber levels with reduced calories among which are included soy polysaccharide materials. Soy polysaccharides (SPS) generally is the residue that remains from the isolation from a soy protein source such as a defatted soybean material. Typically the defatted soy protein material is exhaustively extracted with aqueous materials to isolate the protein after which the residual material that remains comprises, for the most part, various polysaccharides normally found in the soybean material and which until recently was considered a waste material generally unsuitable for further use other than animal feed.

Recently it has been determined that if the soy polysaccharide material is cleaned up in such a manner that little, if any, extraneous material remains in the residual fraction from isolate processing that the material is highly suitable and preferable as a source of dietary fiber for various foodstuffs. The soy polysaccharide fraction derived from isolate processing has found particular application in the production of baked goods particularly bread and its addition to bread dough has produced a bread product of very desirable texture with desirable volume and further provides a product of high fiber content with reduced calories as compared to bread in which this ingredient is not employed. While the use of soy polysaccharides as an ingredient in bread dough has been highly successful, it is still a desirable objective to obtain a soy polysaccharide material of improved baking performance which has a wider range of usage and application in baked goods, including breads to accomplish the objective of a reduced level of calories and a high fiber content.

These and other objectives have been obtained in the present invention in which a soy polysaccharide material of improved baking performance has been obtained which provides a baked products of reduced calories with improved volume and crumb texture.

It is therefore an object of the present invention to provide a process for the production of a baked product having improved specific volume (cc/gm) containing a soy polysaccharide material as dietary fiber source.

It is a further object of the present invention to provide a process for the production of a baked product such as bread, having a soy polysaccharide material as an ingredient which has been treated by a unique process to result in baked products of improved specific volume (cc/gm) and crumb texture when the treated material is incorporated therein.

It is a further object of the present invention to provide a process for the treatment of the soy polysaccharide to provide an improved degree of functionality when employed as an ingredient for baked products.

It is still a further object to provide a process for the treatment of a soy polysaccharide material having improved functionality as an ingredient for baked products which is reliable and convenient to practice on both a continuous and commercial basis.

SUMMARY OF THE INVENTION

The present invention generally relates to a process for the treatment of a soy polysaccharide material in order to provide a material which has an improved functionality when employed as an ingredient for baked products such as bread. The treatment process for the soy polysaccharide material comprises hydrating a soy polysaccharide material with water at a weight ratio of the soy polysaccharide material to water of about 1:0.5 to 1:4, followed by heating of the hydrated material for a temperature and time sufficient to improve the specific volume (cc/gm) of baked products at which the material is employed as an ingredient and as compared to the use of an untreated material. Typically the hydrated soy polysaccharide material is heated at a temperature of about 30°-90° C. for a period of time which is less than about 4 hr. and preferably about 30 minutes to 4 hours, which has been found to provide a treated soy polysaccharide material having an improved degree of functionality when employed in baked products such as bread.

The present invention also relates to a process for the production of a baked product of reduced calories in which the treated soy polysaccharide material is employed as an ingredient whereby a significant improvement is obtained in loaf volume, specific volume and crumb texture by incorporation of the treated soy polysaccharide material in the bread dough. This process comprises forming a sponge from flour, yeast, yeast nutrients and water, followed by the addition to the sponge of about 5-20% by weight of the dough formulation of a treated soy polysaccharide material which has been treated by hydration at a weight ratio of the soy polysaccharide material to water of about 1:0.5 to 1:4, and by heat treatment of the hydrated material at a temperature of about 30°-90° C. for a period of time less than about 4 hr., preferably about 30 minutes to 4 hr. The sponge containing the treated polysaccharide material is then employed to form a dough formulation which contains the balance of the flour, water, salt, mold inhibitors and other materials, followed by baking of the dough containing the treated soy polysaccharide material to thereby provide a baked product of improved specific volume and texture.

The use of the treated soy polysaccharide material as an ingredient in baked goods significantly improves the performance of the soy polysaccharide material as a dietary fiber source in baked products both from a functional as well as an aesthetic standpoint. The use of the treated soy polysaccharide material also permits a wider range of usage in baked products because of the improvement obtained in baking performance by pretreatment of the soy polysaccharide material.

DESCRIPTION OF THE PREFERRED EMBODIMENTS

The soy polysaccharide material that is employed in the present invention comprises a mixture of residual high molecular weight sugars obtained by the treatment of soy flakes, meal or flour in order to remove the soluble proteins and soluble carbohydrates. The heterogeneous polysaccharides are principally cell wall structural components of the soybean cotyledons and are typically obtained as a by-product from the production of a soy protein isolate. A soy polysaccharide product has also sometimes been characterized as the aqueous alkali insoluble residue or the "spent flake fraction" derived from soy isolate processing. In order to illustrate briefly, the manner in which the soy polysaccharides are obtained from soy isolate processing typically a starting material such as soy flakes, meal or flour is first dispersed in an aqueous medium and the pH of the medium adjusted to at least about 7 by the addition of an alkali. The soy flakes, meal or flour is then washed with an aqueous alkaline solution and subjected to centrifugation. The soluble carbohydrate and protein components are then solublized in the aqueous alkaline solution and the insoluble residue is composed of soy polysaccharides which comprise the solids phase. As previously noted, the solids are also sometimes referred to as the "spent flake residue" and in the past has been discarded as a waste by-product soy isolate processing. The insoluble residue is then subjected to a second extraction step with an aqueous alkaline solution in order to exhaustively extract removing soluble protein and carbohydrates. The aqueous extracts from the double extraction procedure are then combined for further processing which includes acid precipitation of the protein from the solution to form an isolate. The residual soy polysaccharide material may then be dried or further processed if desired to remove any extraneous material that may have carried through the isolation procedure. The description set forth above, for obtaining the soy polysaccharide material is not intended to limit the present invention, since the characterization and isolation of this material represents a conventional process known to those skilled in the art for the preparation of the protein material as well as the separation of the polysaccharide material contained in soy flour, flakes, meal or soybeans.

The highly fibrous soy polysaccharide material has a typical analysis after drying with total carbohydrate content of about 80% by weight, a protein content of about 10-18% by weight and an ash content of about 5% by weight. The soy polysaccharide material generally comprises the many high molecular weight carbohydrate polymers contained in soybeans that are polymers of glucose, arabinose, galactose, mannose and xylose. The term soy polysaccharide material is intended to refer to this rather complex mixture of high molecular weight carbohydrate polymers although it is employed as a collective term to describe the fibrous carbohydrate material obtained from the cell wall structural components of soybeans including soy flakes, flour and meal. The soy polysaccharide material when typically employed as an ingredient for various foodstuffs has been dried to an ambient moisture content usually of about 7 to 10% and is employed in the present invention in this form.

The soy polysaccharide material employed in the present invention is treated to improve its functionality as an ingredient for baked products such as bread by initially hydrating the soy polysaccharide material with water at a weight ratio of the soy polysaccharide material to water of about 1:0.5 to 1:4. A preferred weight ratio of soy polysaccharide material to water is about 1:0.5 to 1:3.0. The added moisture is carefully mixed with soy polysaccharide material for complete distribution, followed by heating of the hydrated soy polysaccharide material for a temperature and time that is sufficient to improve the functionality of the treated material in baking applications and particularly for bread in which the loaf volume of the baked product or bread is significantly improved. Heating may be carried out in any type of apparatus or equipment conventionally employed with a typical temperature range for the heating step being about 30°-90° C. for a period of time of about 30 min. to 4 hr. A preferred temperature range and time is about 40° to 80° C. and about 30 min. to 2 hr.

Following hydration and heating of the soy polysaccharide material the material is preferably dried to an ambient moisture content of about 7 to 10 percent by weight, although a drying step is not intended to limit the present invention since the moistened soy polysaccharide material can be employed in a continuous process for the production of a baked material provided that the inherent moisture content of the treated material is taken into account in the formation of the sponge for fermentation and result in production of a baked product such as bread. It is, however, preferred for purposes of the present invention that the treated soy polysaccharide material be dried to about ambient moisture content in order to permit a grinding of the material and reduce the particle size of the soy polysaccharide material to a size sufficient to pass about a 20 to 200 mesh screen.

The following examples illustrate specific but non-limiting embodiments of the present invention.

EXAMPLE 1

A sponge was prepared by mixing the following ingredients with 70% of the water used to prepare the dough.

| Ingredients | % by weight of flour | grams |
| --- | --- | --- |
| Hi gluten flour | 60.0 | 330 |
| Yeast Food | 0.65 | 3.60 |
| Lard | 3.00 | 16.50 |
| Panatex (mono glycerides) | 1.00 | 5.50 |
| Yeast | 2.50 | 13.75 |
| Water | 70.00 | 385.00 |
| Treated Soy Polysaccharide | 15.00 | 82.50 |

The sponge was allowed to ferment for 4 hr. at 85% relative humidity. After fermentation is complete, the sponge is mixed with the following remaining ingredients and water to form a dough.

| Ingredients | % by weight of flour | grams |
|---|---|---|
| Hi gluten flour | 40.0 | 220 |
| Sugar | 6.67 | 36.70 |
| Salt | 2.00 | 11.00 |
| Extram H* | 2.00 | 11.00 |
| Improved Paniplus M 261** | 0.30 | 1.65 |
| Calcium Sulfate | 0.47 | 2.60 |
| Water | 36.0 | 198.0 |

*A blend of soy flour, whey and calcium sulfite, available from Paniplus, Olathe, Kansas.
**A dough conditioner available from Paniplus, Olathe, Kansas.

The mixed dough is then divided into 582 gram pieces, which is allowed to stand for 10 minutes. The dough pieces are molded, placed in a baking pan and proofed to ¼" height above the pan. The dough is then baked at 430° F. for 20 minutes. Following baking, loaf volume, loaf weight and the total height of four center slices of each loaf was measured. The specific volume was calculated from the loaf volume and weight.

The above procedure was used to prepare bread with five different samples of treated soy polysaccharide material and compared to untreated soy polysaccharide material wherein the soy polysaccharide material was hydrated with varying weight ratios of water and heated at the temperature and time noted. The ratio of soy polysaccharide material to water, as well as the specific volume and total height of the bread slices are set forth in Table 1.

TABLE 1

| Soy Polysaccharide to Water Ratio Bread Quality | | | | |
|---|---|---|---|---|
| Weight Ratio SPS/water | Time (hr) | Temp. (°C.) | Specific Volume (cc/gm) | Total Height of 4 slices (in) |
| Untreated | — | — | 4.35 | 17.1 |
| 1:0.5 | 2 | 60 | 4.71 | 18.0 |
| 1:1.0 | 3 | 40 | 4.62 | 18.2 |
| 1:2.0 | 2 | 30 | 4.54 | 17.6 |
| 1:3.0 | 1 | 80 | 4.68 | 18.0 |
| 1:3.5 | 2 | 60 | 4.44 | 17.8 |

An examination of the above data shows an improvement in bread quality has been obtained at all of the weight ratios of SPS/water as compared to an untreated SPS material.

EXAMPLE 2

The procedure of Example 1 was used to prepare bread with four different samples of treated soy polysaccharide material, which was compared to an untreated soy polysaccharide material. The soy polysaccharide material was hydrated with a weight ratio to water as set forth for the various times noted in Table 2. The varying times are noted in Table 2, together with the specific volume and total height of the bread slices.

TABLE 2

| Heating Time of SPS material Bread Quality | | | | |
|---|---|---|---|---|
| Time (hr) | Weight Ratio SPS/water | Temp. (°C.) | Specific Volume (cc/gm) | Total Height of 4 slices (in) |
| Untreated | — | — | 4.35 | 17.1 |
| 0.5 | 1:2.0 | 60 | 4.63 | 18.0 |
| 1.0 | 1:1.0 | 40 | 4.60 | 18.0 |
| 2.0 | 1:0.5 | 60 | 4.69 | 18.0 |

TABLE 2-continued

| Heating Time of SPS material Bread Quality | | | | |
|---|---|---|---|---|
| Time (hr) | Weight Ratio SPS/water | Temp. (°C.) | Specific Volume (cc/gm) | Total Height of 4 slices (in) |
| 3.0 | 1:3.0 | 40 | 4.52 | 17.8 |

An examination of the above data clearly shows an improvement in bread quality at all of the various heating times for the SPS material as compared to an untreated SPS material.

EXAMPLE 3

The procedure of Example 1 was used to prepare bread with five different samples of treated soy polysaccharide material, which was compared to an untreated SPS material. The SPS material was hydrated with a weight ratio of water as set forth and heated at the various temperatures noted in Table 3 for the indicated times. Table 3 also sets forth the specific volume and total height of the bread slices.

TABLE 3

| Heating Temperature of SPS Material Bread Quality | | | | |
|---|---|---|---|---|
| Temp. (°) | Weight Ratio SPS/water | Time (hr) | Specific Volume (cc/gm) | Total Height of 4 slices (in) |
| Untreated | — | — | 4.35 | 17.1 |
| 30 | 1:2 | 2 | 4.54 | 17.6 |
| 40 | 1:3 | 1 | 4.63 | 17.6 |
| 60 | 1:2 | 0.5 | 4.54 | 18.0 |
| 80 | 1:3 | 1 | 4.68 | 18.0 |
| 90 | 1:2 | 2 | 4.58 | 18.2 |

The above data shows at the temperature range disclosed in the present invention, an improvement in bread quality is obtained as compared to the use of an untreated SPS material.

The present invention is intended to include all reasonable variations, equivalents or modifications within its scope, limited only by the appended claims.

I claim:

1. A process for the treatment of a soy polysaccharide material to provide improved functionality as an ingredient for a baked product comprising;
   (a) hydrating a soy polysaccharide material at a weight ratio of soy polysaccharide material to water of about 1:0.5 to 1:4;
   (b) heating said hydrated material for a temperature and time sufficient to improve the specific volume (cc/gm) of the baked product in which the material is used as an ingredient and as compared to the use of an untreated soy polysaccharide material.

2. The process of claim 1 wherein the hydrated material is heated to a temperature of about 30° to 90° C.

3. The process of claim 1 wherein the hydrated material is heated for a period of time of less than about 4 hr.

4. The process of claim 1 wherein the hydrated material is heated for about 30 minutes to 4 hr.

5. The process of claim 1 wherein the hydrated material is heated at a temperature of about 80° C. for about 1 hr.

6. The process of claim 1 wherein the material is hydrated at a weight ratio of soy polysaccharide material to water of about 1:3.

7. The process of claim 1 including the step of drying said treated material.

8. The process of claim including the step of grinding the treated material to a size sufficient to pass about a 20 to 200 mesh screen.

9. A process for the production of baked products of reduced calories having improved specific volume comprising:
(a) forming a flour based dough with about 5 to 20% by weight of the flour of an added soy polysaccharide material which has been treated by hydration at a weight ratio of material to water of about 1:0.5 to 1:4 and heated for a temperature and time sufficient to improve the specific volume (cc/gm) of the baked product; and,
(b) baking the dough containing the treated soy polysaccharide material to provide a baked product of improved specific volume (cc/gm) as compared to the use of an untreated soy polysaccharide material.

10. The process of claim 9 wherein the hydrated material is heated to a temperature of about 30° to 90° C.

11. The process of claim 9 wherein the hydrated material is heated for a period of time of less than about 4 hr.

12. The process of claim 9 wherein the hydrated material is heated for about 30 min. to 4 hr.

13. The process of claim 9 wherein the hydrated material is heated at a temperature of about 80° C. for about 1 hr.

14. The process of claim 9 wherein the material is hydrated at a weight ratio of soy polysaccharide material to water of about 1:3.

15. The process of claim 9 including the step of drying the treated material.

16. The process of claim 9 including the step of grinding the treated material to a size sufficient to pass about a 20 to 200 mesh screen.

17. The process of claim 9 including the step of forming a sponge comprising yeast, flour, yeast nutrients and water to which is added the soy polysaccharide material prior to formation of the dough.

* * * * *